United States Patent [19]

Greenwood

[11] 4,341,740

[45] * Jul. 27, 1982

[54] CATALYST FLOW DAMPENER

[75] Inventor: Arthur R. Greenwood, Niles, Ill.

[73] Assignee: UOP Inc., Des Plaines, Ill.

[*] Notice: The portion of the term of this patent subsequent to Dec. 29, 1998, has been disclaimed.

[21] Appl. No.: 274,909

[22] Filed: Jun. 18, 1981

Related U.S. Application Data

[62] Division of Ser. No. 132,969, Mar. 24, 1980, abandoned.

[51] Int. Cl.$^3$ .................... B01J 8/12; B65G 65/23; B65G 65/32
[52] U.S. Cl. .................... 422/310; 414/217; 422/219; 422/223
[58] Field of Search .................... 252/411 R, 418; 208/150–152, 165–176; 414/217–221; 422/310, 223, 144, 216, 219, 178

[56] References Cited

U.S. PATENT DOCUMENTS

| | | | |
|---|---|---|---|
| 2,448,272 | 8/1948 | Payne et al. | 208/173 |
| 2,451,924 | 10/1948 | Crowley | 422/219 |
| 2,726,938 | 12/1955 | Lassiat | 422/219 |
| 2,739,994 | 3/1956 | Bills | 208/176 |
| 2,985,324 | 5/1961 | Balentine | 414/217 |
| 2,999,012 | 9/1961 | McClure | 422/219 |

Primary Examiner—Bradley Garris
Attorney, Agent, or Firm—James R. Hoatson, Jr.; Robert W. Welch; William H. Page, II

[57] ABSTRACT

An apparatus for the recovery of hot regenerated catalyst particles from a moving bed regenerator column is disclosed. The apparatus is designed to obviate pressure surges in the regenerator column, a condition which has been determined to result from a periodic discharge of hot regenerator catalyst particles into a catalyst hopper vented to the regenerator column.

3 Claims, 1 Drawing Figure

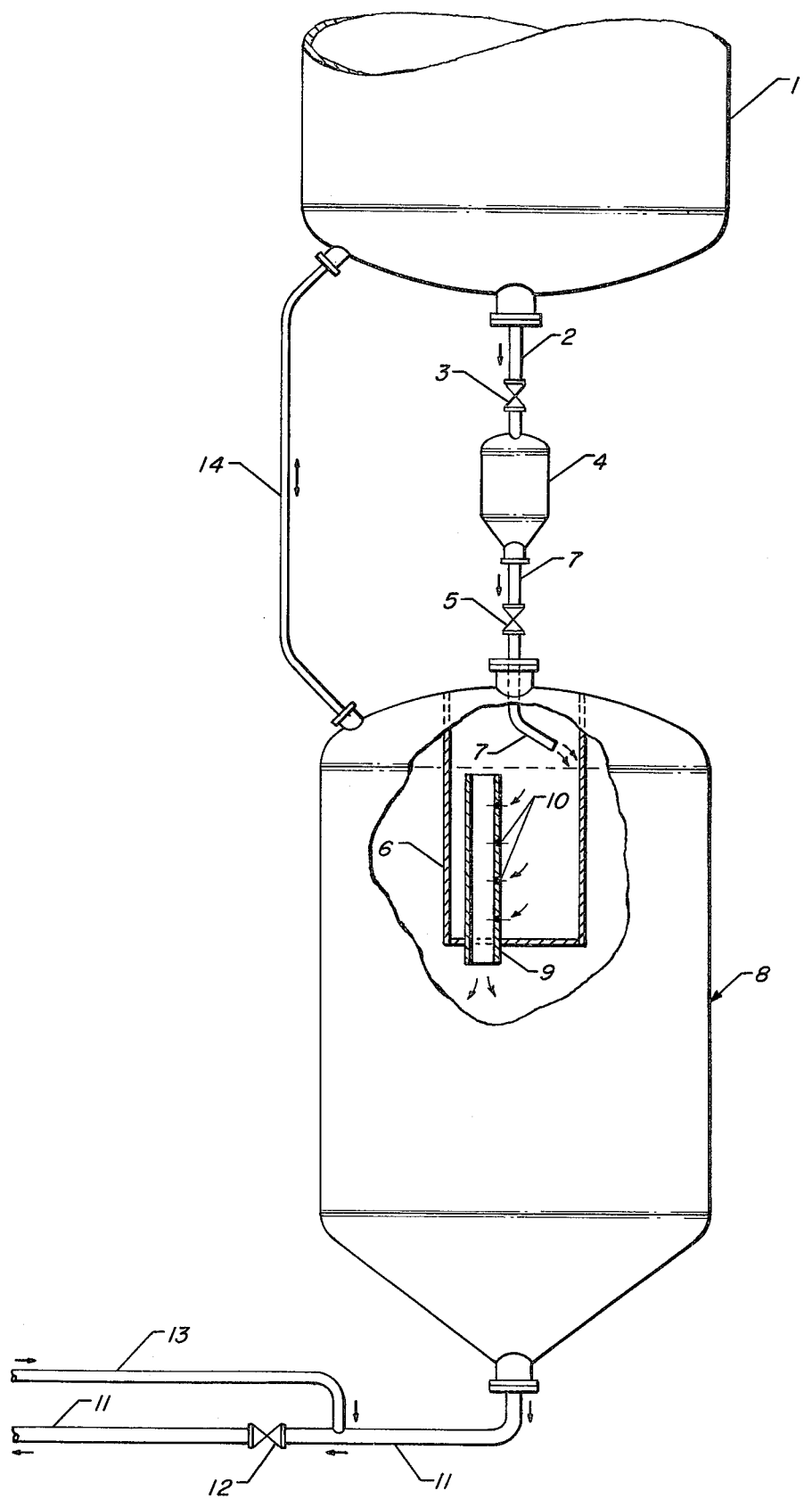

CATALYST FLOW DAMPENER

CROSS-REFERENCE TO RELATED APPLICATION

This application is a Division of a copending application Ser. No. 132,969 filed Mar. 24, 1980, and now abandoned.

With respect to most hydrocarbon conversion processes effected in contact with a particulate catalyst, it is quite conventional to provide means for the periodic regeneration of the catalyst particles. However, in connection with the catalytic reforming of a naphtha or other suitable hydrocarbon feedstock, most of the process units have heretofore operated with a fixed catalyst bed over long periods of time without making provision for periodic regeneration or reconditioning of the catalyst. At such times as reconditioning appeared to be warranted, the reforming reactors were shut down and the entire catalyst inventory removed and replaced with new catalyst, or with catalyst which had been reconditioned at a remote facility. Alternatively, certain reforming operations have been designed to include a swing-reactor, i.e., an extra reactor, and in addition, a rather elaborate piping system so that one reactor at a time could be taken out of service to undergo in-situ regeneration of the catalyst contained therein. Neither the complete catalyst change nor the swing-reactor method of regeneration provide a really satisfactory system for maintaining a desired level of catalyst activity coupled with high conversions in multiple bed reforming reactors. As a result, it has been found to be of advantage to provide for a moving bed catalytic reforming system interacting with a moving bed regeneration system to achieve an optimum overall continuously operating reforming process. The moving bed regeneration system herein contemplated will typically comprise a moving bed of catalyst particles gravitating through a carbon burn-off/halogenation section, and finally through a drying section of a vertically elongated confined chamber. U.S. Pat. Nos. 3,470,090; 3,647,680; 3,785,963; 3,652,231 and 3,981,824 are further descriptive of the continuous catalytic reforming and regeneration process.

In practice, the catalyst inventory in the moving bed regenerator column is maintained at a predetermined level by the periodic discharge of a measured volume of hot regenerated catalyst particles into a catalyst hopper. The periodic discharge is preferred to a continuous discharge in that it requires much simpler hardware and minimizes catalyst attrition. The catalyst hopper is vented to the regenerator column through a pressure equalizer line to facilitate the transfer of said particles from the regenerator column to the catalyst hopper. The regenerated catalyst particles accumulate in the hopper for eventual recycle to the top of the reforming reactor as required to maintain a predetermined catalyst level therein.

A heretofore undetected pressure surge has recently been observed in the regenerator column having the potential to cause excessive temperatures detrimental to the catalyst particles contained therein. It has now been determined that the pressure surge results from the described periodic discharge of hot regenerated catalyst particles, typically at about 800° F., into contact with the substantially cooler vapors, e.g., 200° F., which occur in the catalyst hopper. The effect is a periodic momentary pressure increase in the catalyst hopper due to the thermal expansion of said vapors with a resulting flow of vapors through the pressure equalizer line into the regenerator column. Generally, the hot particles are discharged into the catalyst hopper for a duration of only about 15 to 30 seconds of each 60-second cycle. Thus, as soon as the flow of hot particles into the catalyst hopper has stopped, the pressure begins to subside and there is a flow reversal in the pressure equalizer line. As this cycle repeats itself, air drawn down through the pressure equalizer line during said flow reversal is reinjected into the burning section of the regenerator column, and the oxygen concentration therein becomes momentarily excessive as does the temperature.

It is therefore an object of this invention to present an improved apparatus for the recovery of hot regenerated catalyst particles from a moving bed regenerator column. It is a more specific object to present an apparatus for the recovery of hot regenerated catalyst particles from a moving bed regenerator column through a novel flow dampener having the effect of substantially obviating pressure surges in said regenerator column.

In one of its broad aspects, the present invention embodies an apparatus for the recovery of hot regenerated catalyst particles from a moving bed regenerator column which comprises (a) means of periodically discharging a measured volume of said hot particles from said regenerator column into a flow dampener situated inside a catalyst hopper of substantially larger volume; (b) said flow dampener comprising an enclosed chamber and an open-ended standpipe, the major portion of said standpipe being within said chamber and having its lower open end below the bottom of the chamber, said major portion of the standpipe within the chamber containing a plurality of vertically spaced apart outlet openings through which said flow dampener is in open communication with said catalyst hopper; (c) said outlet means being vertically spaced apart to provide a particle hold-up volume between said outlet means substantially equivalent to the aforesaid measured volume; and (d) said outlet openings being individually sized to accommodate a particle flow rate up to about 50% of the average flow rate at which said particles are discharged into said flow dampener whereby a substantially continuous flow of hot particles is discharged from said flow dampener through said outlet openings and into said catalyst hopper.

Other objects and embodiments of this invention will become apparent in the following more detailed specification.

The further description of this invention is presented with reference to the attached schematic drawing representing one preferred embodiment of the invention.

In the drawing, there is shown a portion of the lower or drying section of a moving bed regenerator column 1. Typically, the catalytic particles subjected to moving bed regeneration in the manner herein contemplated will be an alumina-supported platinum catalyst quite spherical in form with a diameter in the 1/32-½" range to provide free-flow characteristics not given to bridging or blocking of the descending moving bed system. The hot regenerated catalytic particles are withdrawn from the bottom of said regenerator column 1 through conduit 2 and a control valve 3 into a flow control hopper 4 having a capacity of about 952 cubic inches, and said flow control hopper is filled to capacity. Control valve 3 and control valve 5 are programmed to alternate between the open and the closed positions on a 60-second cycle, with control valve 5 remaining in the open position for about 15–30 seconds of said cycle to discharge the measured volume of catalyst particles from the flow control hopper 4 into the flow dampener 6 through conduit 7 while control valve 3 is in the closed position. The periodic discharge of the hot catalytic particles into the flow dampener 6 will not create any substantial pressure surge therein. This follows from the fact that the flow dampener vapors will achieve but not exceed the temperature of the hot particles contained therein; that the flow dampener itself affords little opportunity for any substantial heat loss—a condition which can of course be optimized with added insulation; and from the fact that the flow dampener has only a bottom-located outlet to the catalyst hopper whereby the hot vapors, by reason of their relatively low density, will be trapped in the dampener at a substantially steady-state temperature not conducive to pressure surges.

In accordance with the present invention, said flow dampener 6 is situated inside a catalyst hopper 8 of substantially larger volume. The hopper is an integral part of the moving bed system and functions as a reservoir from which catalyst particles are recycled to the reforming reactors which are not shown. The catalyst hopper is of a volume to receive the entire catalyst inventory of the moving bed regenerator during periods of shut-down to accomplish, for example, routine plant maintenance. During normal periods of operation, the catalyst level in the surge hopper is indicative of the catalyst attrition rate, and of the need for adding catalyst to the system. In any case, the flow dampener 6 embodies an open-ended standpipe 9 containing a plurality of vertically spaced apart outlet means 10. In the present illustration, four outlet means are shown, the lowermost being sized to accommodate a particle flow rate which is about 50% of the average rate at which the catalyst particles are discharged into the flow dampener 6. For example, since about 952 cubic inches of catalyst particles are discharged into the flow dampener every minute, the lowermost outlet means is sized to accommodate about 476 cubic inches per minute. The vertical distance between the lowermost outlet means and the outlet means immediately above is such as to provide a particle retention volume between said outlet means which is equal to or larger than the flow control hopper volume. It will be appreciated that, under normal conditions of operation, only one additional outlet means is in use when the flow control hopper 4 is emptied into the flow dampener. The upper three outlet means are each sized to accommodate a particle flow of about 25% of the average rate at which said particles are discharged into the flow dampener, and the vertical distance between said upper outlet means is substantially as described with respect to the two lower outlet means. The flow control dampener will thus function properly at any flow rate between 50% and 125% of the designed average particle discharge rate from said regenerator column. The described flow dampener will convert the periodic flow of catalyst particles from the flow control hopper into a continuous flow into the catalyst hopper with only about a 25% fluctuation in the flow rate. This is nevertheless quite sufficient to avoid any undue temperature fluctuation in the catalyst hopper and to substantially obviate any consequent pressure surge. The standpipe 9 is open at the top to provide for particle overflow whenever plant maintenance requires rapid dumping of the catalyst particles into the catalyst hopper.

As heretofore mentioned, catalyst particles are recycled from the catalyst hopper to the reforming reactors, which are not shown. Said particles are withdrawn from the surge hopper through line 11 and a control valve 12. A nitrogen purge stream is provided to the catalyst hopper by way of line 13. Line 14 is a pressure equalizer line through which the catalyst hopper is vented to the regenerator column to facilitate a controlled transfer of particles from said column to said catalyst hopper.

From the foregoing, it is apparent that the present invention embodies a relatively simple flow dampener device effecting a substantially steady and continuous flow of hot catalyst particles into the catalyst hopper, and a substantially steady-state heat transfer from the particles to the catalyst hopper vapors. In this manner, pressure fluctuations originating in the catalyst hopper and reflected as excessive temperatures in the regenerator column are substantially obviated, as is the catalyst damage commonly associated therewith.

I claim as my invention:

1. An apparatus for the recovery of hot regenerated catalyst particles from a moving bed regenerator column which comprises:
   (a) means for periodically discharging a measured volume of said hot particles from said regenerator column into a flow dampener situated inside a catalyst hopper of substantially larger volume;
   (b) said flow dampener comprising an enclosed chamber and an open-ended standpipe, the major portion of the standpipe being within said chamber and having its lower open end below the bottom of the chamber, said major portion of the standpipe within the chamber containing a plurality of vertically spaced apart outlet openings through which said flow dampener is in open communication with said catalyst hopper;
   (c) said outlet openings being vertically spaced apart to provide a particle hold up volume between said outlet openings substantially equivalent to the aforesaid measured volume; and,
   (d) said outlet openings being individually sized to accommodate a particle flow rate up to about 50% of the average flow rate at which said particles are discharged into said flow dampener, whereby a substantially continuous flow of hot particles is discharged from said flow dampener through said outlet openings and into said catalyst hopper.

2. The apparatus of claim 1 further characterized in that said standpipe comprises four vertically spaced apart outlet openings.

3. The apparatus of claim 1 further characterized in that said standpipe comprises four vertically spaced apart outlet openings, the lowermost of which is sized to accommodate a particle flow rate about 50% of the average rate at which said particles are discharged into said flow dampener, and the remaining outlets are individually sized to accommodate a particle flow rate about 25% of the average rate at which said particles are discharged into said flow dampener.

* * * * *